(12) United States Patent
Jeon

(10) Patent No.: US 9,085,092 B2
(45) Date of Patent: Jul. 21, 2015

(54) APPARATUS FOR SLICING INGOT

(75) Inventor: Dae Hyun Jeon, Gyeongbuk (KR)

(73) Assignee: LG Siltron Inc. (KR)

( * ) Notice: Subject to any disclaimer, the term of this patent is extended or adjusted under 35 U.S.C. 154(b) by 0 days.

(21) Appl. No.: 13/821,618

(22) PCT Filed: Feb. 23, 2012

(86) PCT No.: PCT/KR2012/001384
§ 371 (c)(1),
(2), (4) Date: Mar. 8, 2013

(87) PCT Pub. No.: WO2012/115462
PCT Pub. Date: Aug. 30, 2012

(65) Prior Publication Data
US 2013/0327308 A1 Dec. 12, 2013

(30) Foreign Application Priority Data

Feb. 23, 2011 (KR) .................. 10-2011-0015797

(51) Int. Cl.
*B28D 5/04* (2006.01)
*B28D 5/00* (2006.01)

(52) U.S. Cl.
CPC ............... *B28D 5/045* (2013.01); *B28D 5/007* (2013.01)

(58) Field of Classification Search
CPC ............ B28D 5/045; B28D 5/04; B28D 1/06; B24B 55/02; B24B 57/00
USPC .............. 125/21, 16.02, 16.01; 451/453, 168, 451/296
See application file for complete search history.

(56) References Cited

U.S. PATENT DOCUMENTS 8,534,275 B2 * 9/2013 Fukuda et al. ............. 125/16.02

FOREIGN PATENT DOCUMENTS

| JP | 11-277395 | 10/1999 |
| JP | 2002-283208 | 10/2002 |
| JP | 2004-322299 | 11/2004 |
| JP | 2007-273711 | 10/2007 |
| JP | 2009-535224 | 10/2009 |
| KR | 10-0936894 | 1/2010 |
| KR | 10-1038182 | 6/2011 |
| WO | WO 2009/104222 | 8/2009 |

OTHER PUBLICATIONS

Japanese Patent Application No. 2013-530104, Office Action dated Feb. 18, 2014 (No English translation provided).
Notice of Allowance for Korean patent application 10-2011-0015797 mailed Sep. 11, 2012.
PCT International Search Report for PCT/USKR2012/001384 mailed Sep. 24, 2012.

* cited by examiner

*Primary Examiner* — Robert Rose
(74) *Attorney, Agent, or Firm* — Lewis Roca Rothgerber LLP

(57) ABSTRACT

Provided is an apparatus for slicing an ingot. The apparatus for slicing the ingot includes a mounting part on which the ingot is mounted, a wire saw disposed under the mounting part, a slurry supply part supplying slurry from an upper side of the wire saw, and a slurry blocking part disposed on the mounting part. The slurry blocking part includes a fixing part coupled to one side of the mounting part and a slurry collection part to which a central portion thereof is coupled to a lower portion of the fixing part.

15 Claims, 3 Drawing Sheets

APPARATUS FOR SLICING INGOT

CROSS-REFERENCE TO RELATED APPLICATIONS

The present application is a national phase application of P.C.T. application PCT/KR2012/001384 filed Feb. 23, 2012, which claims the priority benefit of Korean patent application 10-2011-0015797 filed Feb. 23, 2011, the disclosures of which are incorporated herein by reference.

BACKGROUND OF THE INVENTION

1. Field of the Invention

The present invention relates to ingots. More specifically, the present invention relates to an apparatus for slicing ingots.

2. Description of the Related Art

In general, wafers such as silicon are manufactured by slicing a single crystal silicon ingot into a thin thickness. The single crystal silicon ingot is sliced by an apparatus for slicing a single crystal ingot.

In an apparatus for slicing a single crystal ingot according to a related art, an ingot descends to a wire saw rotated at a high speed to perform a slicing process. A slurry (abrasive+oil) acting as an ingot slicing material and a lubricating agent is supplied into the wire saw.

However, a portion of the slurry supplied into the ingot during the slicing process of the ingot is rolled up along the wire saw to collide with a mounting part for fixing the ingot. The slurry colliding with the mounting part drops down and then is permeated between the sliced ingots. Thus, a warpage phenomenon of a sliced surface of the ingot may occur.

The warpage phenomenon may cause poor quality and inferiority of a substrate manufactured from the sliced ingot.

SUMMARY OF THE CLAIMED INVENTION

Technical Problem

Embodiments provide an apparatus for slicing an ingot, which effectively slices the ingot to manufacture a wafer having improved quality.

Solution to Problem

In one embodiment, an apparatus for slicing an ingot includes: a mounting part on which the ingot is mounted; a wire saw disposed under the mounting part; a slurry supply part supplying slurry from an upper side of the wire saw; and a slurry blocking part disposed on the mounting part, wherein the slurry blocking part includes: a fixing part coupled to one side of the mounting part; and a slurry collection part to which a central portion thereof is coupled to a lower portion of the fixing part.

In another embodiment, an apparatus for slicing an ingot includes: a work plate; a beam fixing the ingot to a lower portion of the work plate; a slurry blocking part disposed under the work plate and at one side of the beam; a wire saw for slicing the ingot; and a slurry supply part for supplying slurry onto the wire saw.

In further another embodiment, an apparatus for slicing an ingot includes: a work plate supporting the ingot; a beam disposed between the work plate and the ingot; a slurry blocking part disposed at one side of the beam and between the ingot and the work plate; and a wire saw disposed under the work plate.

Advantageous Effects of Invention

In the current embodiment, the slurry blocking part may be provided on the one side of the mounting part to prevent the scattered slurry from being introduced again into the ingot.

Also, the slurry induction part may be disposed on the one side of the slurry collection part to stably collect the scattered slurry into the slurry collection part.

Also, the blocking part may be disposed on the other side of the slurry collection part to prevent the slurry from flowing into the working space by overflowing toward the rear side of the slurry collection part.

Also, the discharge part may be disposed on the side surface of the slurry collection part to stably discharge the slurry collected into the slurry collection part to the outside.

DETAILED DESCRIPTION

Hereinafter, embodiments will be described in detail with reference to the accompanying drawings.

Figure 1:
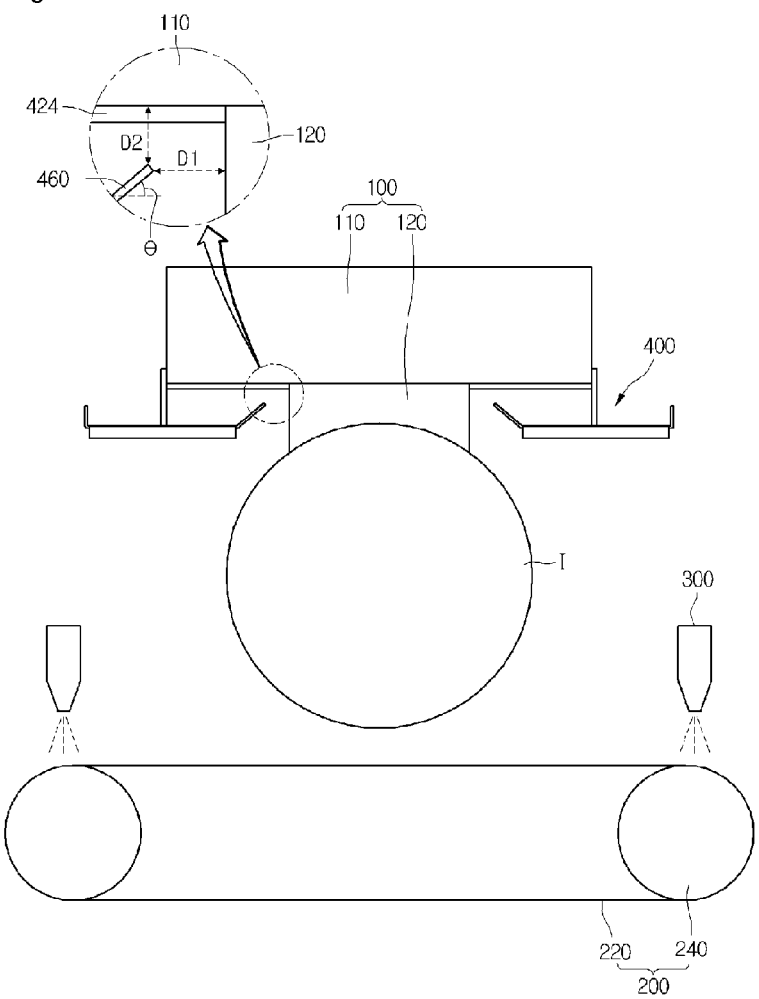
FIG. 1 is a view of an apparatus for slicing a single crystal ingot according to an embodiment.
Figure 2:
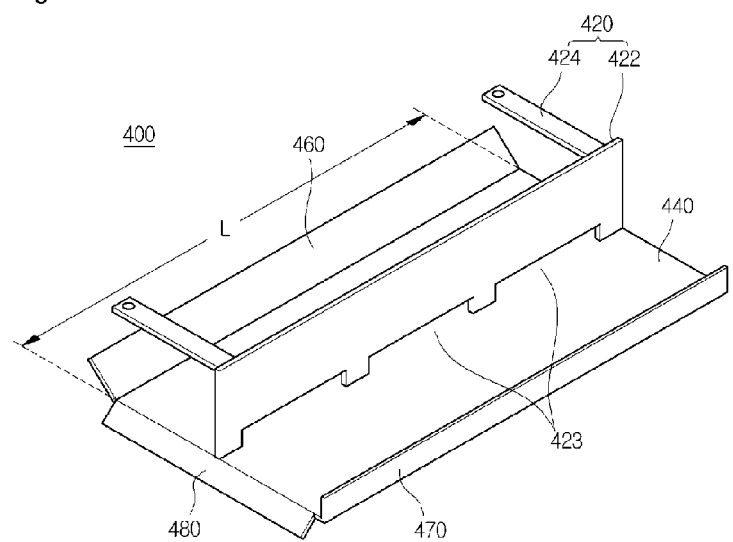
FIG. 2 is a perspective view of a slurry blocking part mounted on the apparatus for slicing the single crystal ingot according to an embodiment.
Figure 3:
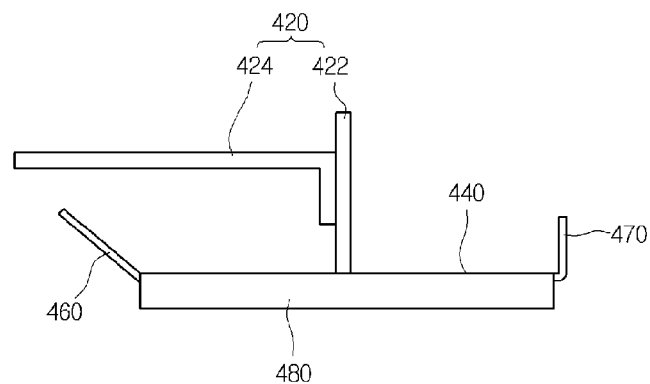
FIG. 3 is a sectional view of the slurry blocking part mounted on the apparatus for slicing the single crystal ingot according to an embodiment.
Figure 4:
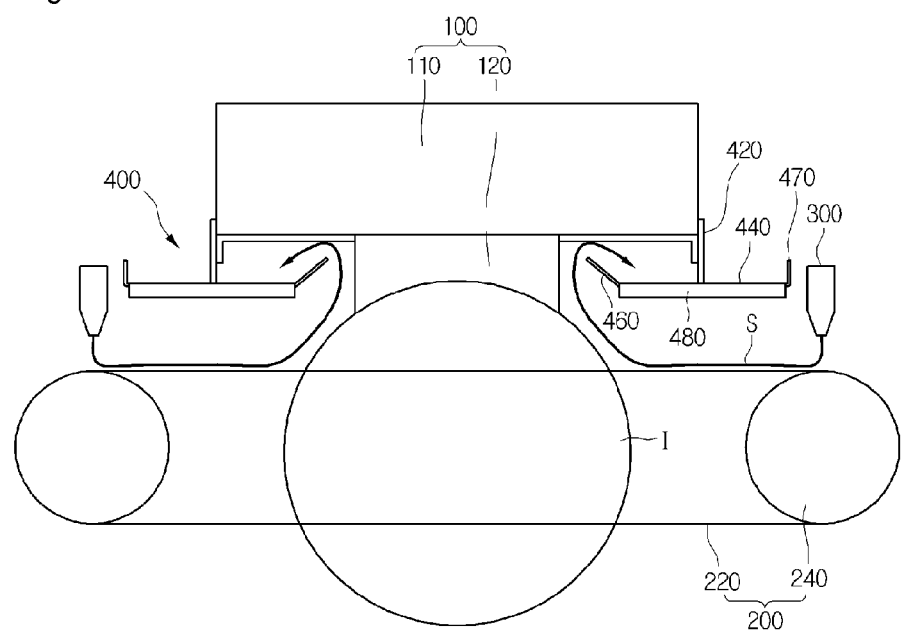
FIG. 4 is a view illustrating an operation of the apparatus for slicing the single crystal ingot according to an embodiment.
Figure 5:
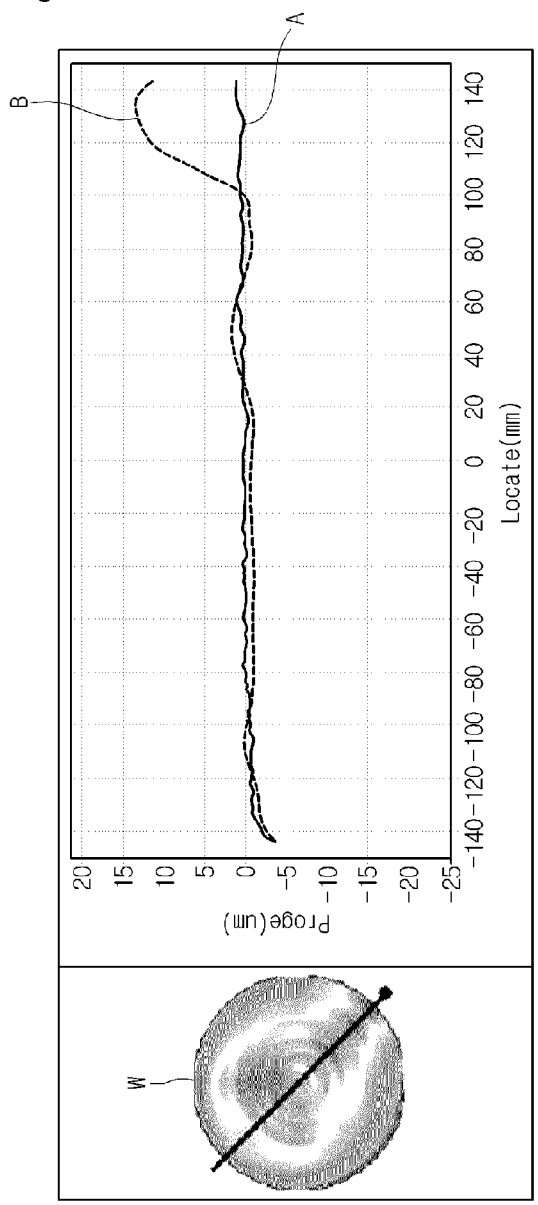
FIG. 5 is a comparison graph illustrating warpage degrees of substrates after a process is performed according to an embodiment and a related art.

FIG. 1 is a view of an apparatus for slicing a single crystal ingot according to an embodiment. FIG. 2 is a perspective view of a slurry blocking part mounted on the apparatus for slicing the single crystal ingot according to an embodiment. FIG. 3 is a sectional view of the slurry blocking part mounted on the apparatus for slicing the single crystal ingot according to an embodiment. FIG. 4 is a view illustrating an operation of the apparatus for slicing the single crystal ingot according to an embodiment. FIG. 5 is a comparison graph illustrating warpage degrees of substrates after a process is performed according to an embodiment and a related art.

Referring to FIG. 1, an apparatus for slicing a single crystal ingot according to an embodiment includes a mounting part 100 on which an ingot I is mounted, a wire saw 200 disposed under the mounting part 100, a slurry supply part 300 supplying slurry from an upper side of the wire saw 200, and a slurry blocking part 400 disposed on the mounting part 100.

The mounting part 100 is disposed above the ingot I. The mounting part 100 may be vertically moved in a state where the mounting part 100 fixes an upper portion of the ingot I. For this, a separate driving part (not shown) for moving the mounting part 100 may be further disposed on one side of the mounting part 100. The ingot I may be a silicon ingot I.

The mounting part 100 includes a work plate 110 and a beam 120. The work plate 110 supports the beam 120. In detail, the beam 120 is fixed and supported to a lower portion of the work plate 110.

The ingot I may be fixed to the work plate 110 through the beam 120. That is, the ingot I may adhere to the beam 120 through an epoxy adhesive, and the beam 120 may be fixed to the work plate 110. The beam 120 may be fixed to the work plate 110 by a bolt. The beam 120 is disposed between the ingot I and the work plate 110.

The wire saw 200 is disposed under the mounting part 100. The wire saw 200 includes a rotated and reciprocated wire 200 and guide rollers 240 disposed facing each other to wind the wire 200 therearound. The wire 200 may be provided in plurality to slice the ingot I into a plurality of substrates. Here, one of the guide rollers 240 may be a driving roller for driving the guide rollers.

Thus, the wire saw 200 may slice the ingot I having a cylindrical shape to a thin thickness to manufacture the plurality of substrates.

The slurry supply part 300 is disposed above the wire saw 200. The slurry supply part 300 may supply slurry onto the wire 220 proceeding at a high speed on the guide rollers 240 to slice the ingot I using the supplied slurry.

The slurry supply part 300 may be disposed above each of the guide rollers 240 rotating the wire 220. Here, the slurry supply part 300 may supply the slurry onto all of the wire 220 and the guide rollers 240.

A plurality of nozzles (not shown) for injecting the slurry may be disposed on a lower portion of the slurry supply part 300. The slurry may be manufactured by mixing finely pulverized abrasives with oil at a predetermined concentration.

As described above, the slurry may cause a friction force on a surface of the ingot I while being moved together with the wire 220 to allow the wire 220 to easily slice the ingot I.

The slurry blocking part 400 according to an embodiment is disposed on one side of the mounting part 100. In detail, the slurry blocking part 400 is disposed under the work plate 110. The slurry blocking part 400 is disposed between the work plate 110 and the ingot I. Also, the slurry blocking part 400 is disposed at one side of the bean 120.

The slurry blocking part 400 prevents the slurry scattered onto a top surface of the ingot I to be sliced from flowing again toward the ingot I. In detail, the slurry blocking part 400 prevents the slurry scattered toward the mounting part 100 from flowing downward toward the ingot I.

As shown in FIGS. 2 and 3, the slurry blocking part 400 according to an embodiment includes a fixing part 420 and a slurry collection part 440 coupled to the fixing part 420.

The fixing part 420 includes a first fixing part 422 and a second fixing part 424. The first fixing part 422 has a rectangular plate shape. Also, the first fixing part 422 has one surface fixed to an outer surface of the mounting part 100. In detail, the first fixing part 422 may be fixed to a side surface of the work plate 110 by a bolt.

The second fixing part 424 is coupled to an under surface of the mounting part 100. The second fixing part 424 has a bar shape extending vertically from one surface of the first fixing part 422. The second fixing part 424 may be fixed to an under surface of the work plate 110. The second fixing part 424 may be provided in plurality. The plurality of second fixing parts 424 may be disposed on one surface of the first fixing part 422 so that the second fixing parts 424 are spaced from each other.

The fixing part 420 may support the outside and the under surface of the work plate 110 at the same time to more stably fix and support the slurry blocking part 400 to the mounting part 100 while the mounting part 100 is moved.

The slurry collection part 440 for collecting the scattered slurry is disposed under the fixing part 420. The slurry collection part 440 includes a plate having a bar shape. The slurry collection part 440 has a length L in a length direction to correspond to that of the ingot I.

Here, the fixing part 420 may be coupled to a central portion of the slurry collection part 440. A cutting part 423 cut with a predetermined area may be defined in an under surface of the fixing part 420 so that the slurry collected from the slurry collection part 400 does not interfere with the fixing part 420.

That is, the fixing part 420 may divide the slurry collection part 440 into two areas. That is, the slurry collection part 440 may be divided into a first area and a second area by the fixing part 420. In detail, the first fixing part 422 may define the slurry collection part 440 into the two areas.

Here, the cut part 423 may be defined in the first fixing part 422, and the first and second areas may be connected to each other through the cut part 423. That is slurry on the first area may freely flow onto the second area.

A slurry induction part 460 may be disposed on one side of the slurry collection part 440, i.e., one side of the slurry collection part 440 closest to the ingot I.

The slurry induction part 460 may be inclined upward from the slurry collection part 440 toward the outside. Also, the slurry induction part 460 may induce scattered slurry S so that the slurry S is stably induced into the slurry collection part 440. Here, an inclination θ of the slurry induction part 460 may be inclined at an angle of about 20° to about 60° with respect to the slurry collection part 440, i.e., a horizontal plane. In detail, the slurry induction part 460 may be inclined at an angle of about 30° to about 60°.

Also, one end of the slurry blocking part 400, particularly, one end of the slurry induction part 460 may be spaced from the beam 120. The one end of the slurry induction part 460 may be spaced from a side surface of the bean 120. Here, a distance D1 between the one end of the slurry induction part 460 and the side surface of the beam 120 may be about 1 mm to about 10 mm.

Also, the one end of the slurry blocking part 400, particularly, the one end of the slurry induction part 460 may be spaced from the work plate 110. The one end of the slurry induction part 460 may be spaced from the under surface of the work plate 110. Here, a distance D2 between the one end of the slurry induction part 460 and the under surface of the work plate 110 may be about 1 mm to about 10 mm.

Also, a blocking part 470 for preventing the collected slurry from overflowing toward a rear side may be further disposed on the other side of the slurry collection part 440 on which the slurry induction part 460 is disposed.

The blocking part 470 may extend upward from the other side of the slurry collection part 440. Thus, the blocking part 470 may prevent the collected slurry from flowing over the slurry collection part 440 into a working space, e.g., the wire saw 200.

Also, a discharge part 480 for discharging the collected slurry may be further disposed on a side surface of the slurry collection part 440.

The discharge part 480 may be inclined downward from the slurry collection part 440 toward the outside. Thus, the slurry collected into the slurry collection part 440 may be easily discharged through the side surface of the slurry collection part 440. Here, the discharge part 480 may be disposed on both sides of the slurry collection part 440. Alternatively, the discharge part 480 may be disposed on only at least one surface of the slurry collection part 440.

The slurry blocking part 400 may extend in one direction on the whole. That is, the slurry blocking part 400 may extend to correspond to a direction in which the ingot I extends. That is, the slurry blocking part 400 may extend in the same direction as that of the ingot I.

Hereinafter, an operation of the apparatus for slicing the single crystal ingot according to the current embodiment will be described with reference to FIG. 4.

Referring to FIG. 4, when the ingot I supported by the mounting part 100 descends to exceed a point corresponding to about ½ of a diameter of the ingot I, slurry S stained on the surface of the travelling wire 220 is moved in an arrow direction along a top surface of the ingot I and a side surface of a lower portion of the mounting part 100.

The moved slurry S is collected into the slurry collection part 440 along the slurry induction part 460 of the slurry blocking part 400 disposed on one side of the mounting part 100. That is, the slurry S injected through the slurry supply part 300 may be stained on a surface of the wire 220. Then, the slurry S may be scattered into a space between the beam 120 and the one end of the slurry induction part 460. The slurry S introduced into the space between the beam 120 and the one end of the slurry induction part 460 may be introduced into the slurry collection part 440 through a space between the work plate 110 and the slurry induction part 460.

The collected slurry S is discharged along the discharge part 480 disposed on the side surface of the slurry collection part 440, but a rear side of the slurry collection part 440.

Here, since the slurry supply part 300 is disposed above the guide roller 240 for rotating the wire 220, the slurry supply part 300 does not interfere with the descending slurry blocking part 400.

Also, since the slurry collection part 440 has a length corresponding to that of the ingot I, the slurry collection part 440 does not interfere with the wire saw 200 even through the slurry S is discharged through the side surface of the slurry collection part 440.

As described above, the slurry blocking part 400 according to an embodiment may sufficiently collect the scattered slurry S. Also, the slurry blocking part 400 may induce the slurry S toward the side surface thereof, but the rear side, to prevent the slurry S from flowing again into the working space as well as the ingot I.

Thus, the apparatus for slicing the ingot according to the current embodiment may effectively slice the ingot to manufacture a wafer having improved quality.

Referring to FIG. 5, comparing warpage degrees of substrates according to the current embodiment and a related art to each other, it may be seen that warpage A of the substrate sliced using the apparatus for slicing the single crystal ingot are very uniform when compared to warpage B of the substrate according to the related art.

It will be apparent to those skilled in the art that various modifications and variations can be made in the present disclosure. Thus, it is intended that the present disclosure covers the modifications and variations of this invention provided they come within the scope of the appended claims and their equivalents.

What is claimed is:

1. An apparatus for slicing an ingot, the apparatus comprising:
   a mounting part on which the ingot is mounted;
   a wire saw disposed under the mounting part;
   a slurry supply part supplying slurry from an upper side of the wire saw; and
   a slurry blocking part disposed on the mounting part, wherein the slurry blocking part comprises:
      a fixing part coupled from one side of the mounting part on a lower portion of the mounting part,
      a slurry collection part to which a central portion thereof is coupled to a lower portion of the fixing part; and
      a slurry induction part inclined upward from one side of the slurry collection part toward the outside away from a center portion of the slurry collection part, wherein the slurry induction part is spaced apart from the mounting part and the upper portion of the ingot.

2. The apparatus according to claim 1, wherein the slurry blocking part further comprises a blocking part extending upward from the other side of the slurry collection part.

3. The apparatus according to claim 1, wherein the slurry blocking part further comprises a discharge part inclined downward from a side surface of the slurry collection part toward the outside.

4. The apparatus according to claim 1, wherein the fixing part comprises:
   a first fixing part fixed to a side surface of the mounting part; and
   a second fixing part vertically coupled to the first fixing part, the second fixing part being fixed to an under surface of the mounting part.

5. The apparatus according to claim 1, wherein the slurry collection part is coupled to a lower portion of the first fixing part, and a portion of the first fixing part is cut.

6. The apparatus according to claim 1, wherein the slurry collection part extends in a direction corresponding to a length direction of the ingot.

7. The apparatus according to claim 1, wherein the wire saw comprises a wire and a rotation roller supporting both sides of the wire to reciprocate and rotate the wire.

8. The apparatus according to claim 7, wherein the rotation roller is disposed on the outside of the slurry blocking part toward the ingot.

9. An apparatus for slicing an ingot, the apparatus comprising:
   a work plate;
   a beam fixing the ingot to a lower portion of the work plate;
   a slurry blocking part disposed under the work plate and at one side of the beam;
   a wire saw for slicing the ingot; and
   a slurry supply part for supplying slurry onto the wire saw, wherein the slurry blocking part comprises:
      a slurry collection part facing an under surface of the work plate; and
      a slurry induction part inclined upward from one side of the slurry collection part toward the outside away from a center portion of the slurry collection part, wherein the slurry induction part has one end spaced from the beam and the under surface of the work plate and the upper portion of the ingot.

10. The apparatus according to claim 9, wherein the slurry blocking part comprises a fixing part for fixing the slurry collection part to the work plate.

11. The apparatus according to claim 9, wherein slurry supplied from the slurry supply part is collected into the slurry collection part through a space between the slurry induction part and the beam and a space between the slurry induction part and the work plate.

12. The apparatus according to claim 9, wherein a distance between the one end of slurry induction part and the beam is about 1 mm to about 10 mm.

13. The apparatus according to claim 10, wherein the fixing part divides the slurry collection part into a first area and a second area, and the fixing part comprises a cut part connecting the first and second areas to each other.

14. The apparatus according to claim 9, wherein the slurry collection part extending in the same direction as a direction in which the ingot extends.

15. The apparatus according to claim 10, wherein the fixing part comprises:
   a first fixing part disposed on a side surface of the work plate; and
   a second fixing part disposed on an under surface of the work plate.

* * * * *